May 26, 1959 — B. N. HOFFSTROM — 2,888,258

SPRINGS

Filed May 11, 1956 — 2 Sheets-Sheet 1

INVENTOR
Bo Nilsson Hoffstrom

ATTORNEYS

May 26, 1959　　　B. N. HOFFSTROM　　　2,888,258
SPRINGS
Filed May 11, 1956　　　　　　　　　　　2 Sheets-Sheet 2
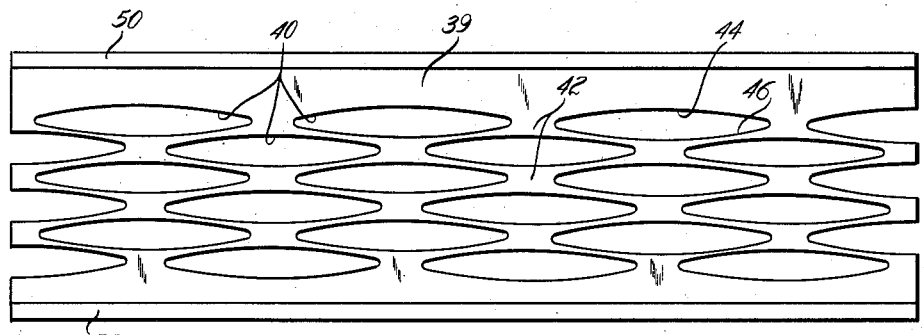
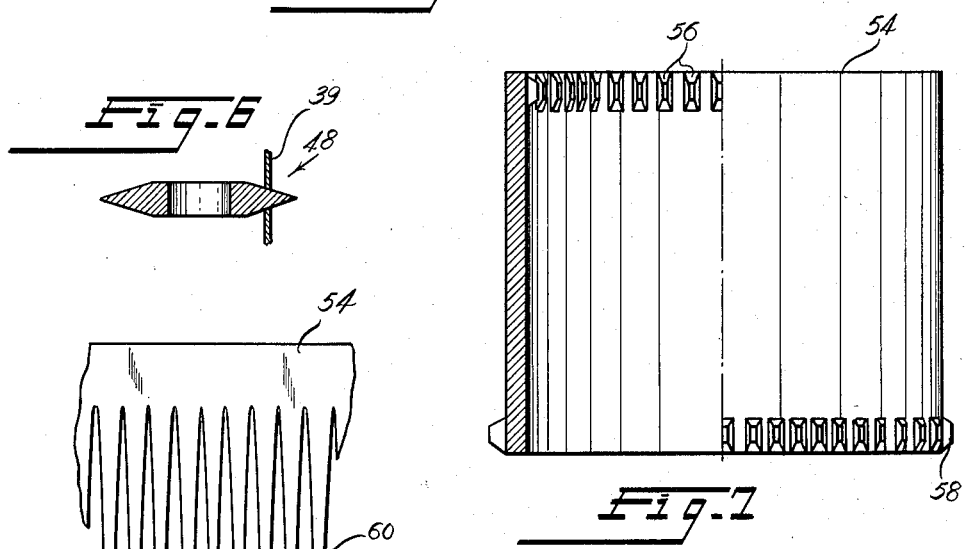
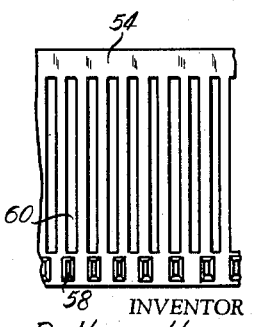
INVENTOR
Bo Nilsson Hoffstrom
BY
ATTORNEYS United States Patent Office 2,888,258
Patented May 26, 1959

2,888,258
SPRINGS
Bo Nilsson Hoffstrom, New York, N.Y.
Application May 11, 1956, Serial No. 584,236
3 Claims. (Cl. 267—1)

This invention relates to improved spring constructions and more particularly to springs which provide improved performance in environments in which the springs are subjected to loads in tension or in compression, or to loads which are alternately applied in tension and compression, or to torsional loads.

In such environments coil springs are presently widely used. While such springs are satisfactory for many applications they have serious disadvantages in other applications and are used despite these disadvantages simply because nothing better is available. For example, it is generally recognized that the diameter of the coil spring wire must be at least one-twentieth of the overall spring diameter for satisfactory performance. This factor alone precludes the use of coil springs in many installations where a space of the required radial thickness is not available for the spring.

Further, coil springs, when compressively loaded, are often unstable and subject to buckling unless supported against lateral displacement. The use of the necessary support causes wear, other mechanical difficulties and often imposes friction loads on the spring which seriously affect its performance, especially in instruments and regulators.

Coil springs do not naturally lend themselves to applications involving a continuous deflection from tension through zero load to compression. This a very frequent requirement in practical cases, and is commonly obtained with coil springs by the use of one compression spring on either side of a movable spring washer, attached to a rod. The other ends of the coil springs are held stationary by fixed seats.

The springs of the present invention fulfill this requirement without any additional parts.

It is a primary purpose and object of the present invention to provide improved spring constructions which overcome the above stated and other disadvantages of coil springs and similar resilient units.

In accomplishing this objective the present invention provides improved spring constructions which are preferably, although not necessarily, of integral construction and which comprise a plurality of interconnected cantilever beams which form a resilient wall assembly.

One embodiment of the invention comprises spring constructions especially adapted for handling loads in compression or tension while another embodiment is particularly useful in handling torsion loads.

These improved spring constructions have the following additional principal advantages:

(1) They afford complete freedom of choice of applied force regardless of the size and configuration of the space in which the spring is used.

(2) They inherently have high volumetric efficiency and automatically utilize the available space to a greater degree than conventional springs.

(3) They may be formed by machining to dimensional tolerances which cannot be approached in the manufacture of coil springs.

(4) They inherently are self-supporting against lateral deflection or buckling in much greater slenderness ratios than coil springs and thus eliminate the need for external support and the friction losses developed between the support and the spring.

(5) They are in certain forms not subject to twisting or rotation when deflected and thus lend themselves to rigid attachment to end members which are intended to be non-rotatably associated or where induced rotation could cause malfunctioning, as in the case of a threaded attachment.

(6) They effectively transmit only symmetrically balanced forces to the end members to which they are attached thus providing a uniform spring action along their entire lateral length and eliminating any tendency toward cocking.

(7) Their end sections may be formed to any desired shape to permit attachment in a variety of ways to end members which apply loads in tension or compression or both to the springs.

(8) They may assume any shape to which sheet material or machine parts may be formed.

(9) They are redundant structures since failure of one or even several operating elements may reduce performance but will not cause complete failure of the springs.

(10) They inherently equalize applied loads so that peak stresses are substantially the same in the spring members despite dimensional difference produced in manufacture.

Additional objects and advantages will become apparent as the description proceeds in connection with the accompanying drawings in which:

Figure 5 is a side elevation of a modified spring construction;

Figure 6 is a central section taken through a tool for forming the spring of Figure 5;

Figure 7 is a side elevation, partly in section, of a blank from which another form of spring is made;

Figure 8 is a fragmentary elevation of a completed spring made from the blank of Figure 7; and Figure 9 is a similar view of a modified form of spring made from the blank of Figure 7.

As suggested above, the spring constructions of the present invention may take any form to which sheet metal may be formed or parts machined. For example, they may take any annular shape such as cylindrical, oval or rectangular and they may be in a form of a wall which may have one or more flat sections or be curved on any radius or combination of radii.

Figures 1 through 5 disclose two forms of the spring construction of the present invention for handling loads in compression or tension. Figures 7, 8 and 9 illustrate modified spring constructions for handling torsional loads.

Figure 1:
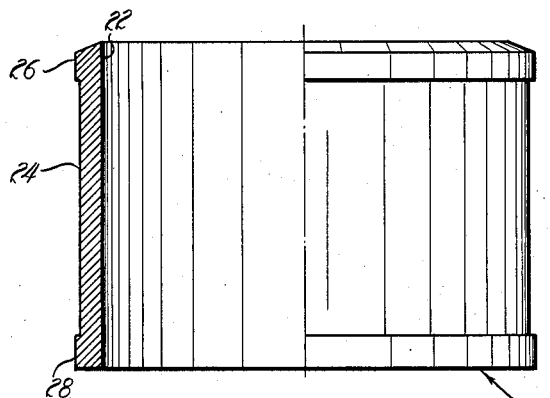
Figure 1 is a side elevation partly in section of a typical blank from which one form of the spring of the present invention is made.

Referring more specifically to Figure 1, the blank 20 from which the spring is made is of tubular form and has a cylindrical inner surface 22, a cylindrical outer surface 24 concentric with the inner surface and relatively thickened end attaching portions 26 and 28. It is a feature of the invention that the end attaching sections 26 and 28 may take any desired form. For example, they may be externally or internally threaded, they may be grooved or ridged or they may be laterally extended to form flanges which may be bolted to the members to be supported by the spring. The blank is preferably formed of steel, bronze, or aluminum alloy (75ST6) although other resilient metals or non-metallic materials may be used if they are machineable and have suitable elastic properties.

Figure 3:
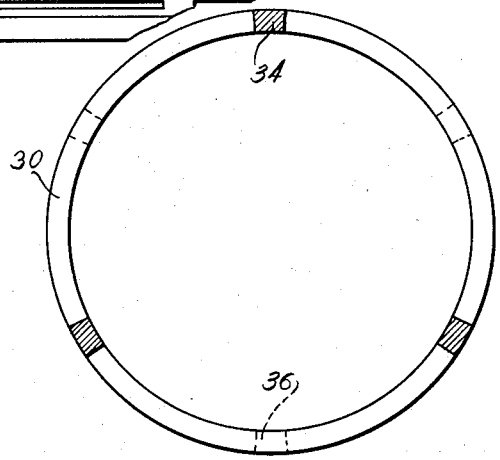
Figure 3 is a transverse section of the blank of Figure 1 after the forming step of Figure 2 has been completed.

The first step in forming the spring from the blank involves the formation of a plurality of slots 30 and 32 in the wall of the blank between the end sections 26 and 28. The slots may be made by punching, blast piercing, milling, grinding, honing, and other well-known methods. The slots, which are of equal length, extend entirely through the wall of the blank and are arranged in alternate circumferentially off-set rows, the slots 30 forming one set of rows and the slots 32 forming the other set of rows. The adjacent ends of the slots 30 are separated by the attaching or bridging portions 34 which in the form of the invention shown are of substantially rectangular section as shown in Figure 3. The adjacent ends of the slots 32 are separated by similar attaching or bridging sections 36.

Figure 2:
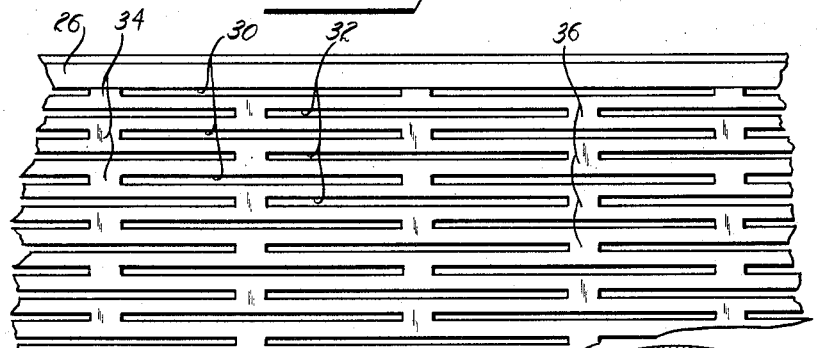
Figure 2 is a developed view of a portion of the blank of Figure 1 as it appears following the initial fabrication step.

In the form of the invention shown, three slots 30 and 32 and three bridging portions 34 and 36 are formed around the circumference of the blank 20 in each transverse plane. The bridging points 34 are disposed above or below the mid-point of the slots 32 and the bridging points 36 are similarly disposed with respect to the slots 30 to form a symmetrical construction. The number of the slots and bridging points in each transverse plane may be varied as dictated by the requirements of a particular installation. However, regardless of the number of such points and the number of slots the relation between the bridging points and slots will remain substantially as shown in Figure 2.

The parent metal remaining after the formation of the slots 30 and 32 comprises a series of spring beams or bars which extend around the periphery of the spring. Each such bar comprises all of the metal remaining between a row of slots 30 and an adjacent row of slots 32. Each bar comprises a number of spring elements which consist of one half of the metal at each bridging point and of the bar extending toward the bridging point at the other end of the same slot. Each of the spring elements thus acts, and has the same working capacity, as a beam fixed at both ends and loaded at its center.

Figure 4:
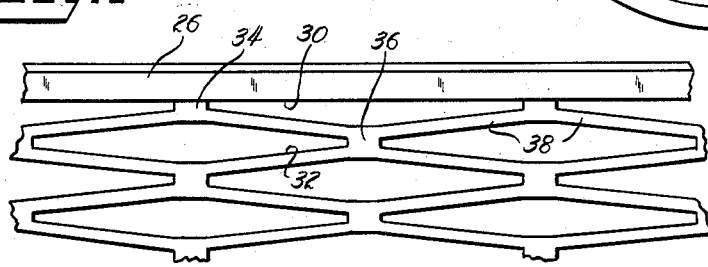
Figure 4 is a fragmentary plan view of a portion of the completed spring assembly.

In certain installations, such as those requiring increased deflection under compression, it may be desirable, before installation, to stretch the slotted blank axially by axially separating the end sections 26 and 28 to permanently deflect the individual spring beams 38 so that under no load the assembly assumes the configuration shown in Figure 4. After proper heat treatment, if such is necessary, the spring is ready for installation in any environment which requires resistance to compressive or tensile loads or a combination of the two types of loads.

Spring rate (lb./in.) and maximum load carrying capacity can be varied over a very wide range by a variation in number and size of bars. Spring rate increases proportionately to bar height and maximum load as the second power of bar height, all other factors held constant. On the other hand, spring rate is inversely proportional to the third power of bar length (or slot length), while maximum load is inversely proportional to bar length in its first power. It is therefore clear, that almost any spring rate or maximum load carrying capacity can be obtained. The only limitation is that the product of maximum load and total deflection at this load cannot exceed a certain value determined by the total weight of the spring elements and the material's specific weight, modulus of elasticity, and maximum allowable stress.

A modified form of tension-compression spring is illustrated in Figure 5. While, as in the case of the spring described in connection with Figures 1 through 4, the spring of Figure 5 may take any form to which the sheet of material may be formed, for purposes of illustration the spring is shown in the form of a flat plate. The blank from which the spring of Figure 5 is formed is a flat sheet of material 39, for example, steel, or 75ST6 aluminum or other suitable material and is preferably of uniform thickness. The spring is formed from the blank by forming a plurality of slots 40 through the wall of the blank. The arrangement of the slots in alternate off-set rows and the separation of the slots by bridging points 42 is essentially the same as that described in connection with the spring of Figures 1 through 4. The principal difference between the spring of Figure 5 and the form of the invention previously described resides in the configuration of the individual slots 40, the opposite lateral margins 44 and 46 of which are smoothly curved. Slots of this configuration may be formed in a number of ways, for example, by a cutter, grinding wheel or honing wheel of the type shown at 48 in Figure 6. A tool of this type, if fed through the wall of the blank to the depth shown diagrammatically in Figure 6, will automatically produce a slot 40 of the configuration shown in Figure 5. The spring of Figure 5 is provided along its opposite longitudinal edges with suitable attaching sections 50 and 52 which may be in the form of flanges or may take other forms depending upon the construction of the structural parts which are to be connected or supported by the spring.

The spring of Figure 5 may be used for many purposes without further treatment or deformation. However, where space is at a premium and the spring is to be utilized primarily to handle tension loads, the spring is preferably heated and solidly compressed while heated to permanently deform the individual spring members. The spring may then be hardened by any appropriate heating or cooling treatment.

In the embodiment of Figure 5 the height of the bars is not constant but is larger at points of attachment and smaller at intermediate points. The shape of the bars in Figure 5 approaches that required to produce constant stress over their length under load. Because of this feature the spring according to Figure 5 has a working capacity (product of maximum load and related deflection) of the order of twice that of the spring shown in Figure 2 for the same total weight, stress, and material.

The invention also contemplates springs adapted to handle torsion loads with unique effectiveness. Such spring constructions are shown in Figures 7, 8 and 9, Figure 7 showing the blank from which the spring is constructed and Figures 8 and 9 showing, on enlarged scale, a portion of two forms of the finished spring. The blank 54 is preferably in the form of a cylinder of uniform thickness except at its opposite ends where it is provided with end portions for attachment to the members which load the spring. In the form shown the blank is provided at the upper end with internal splines or gear formations 56 and at its lower end with similar external formations 58. However, it will be understood that other connecting constructions may be used and that both of the splined or gear sections may be located externally or internally of the blank.

The spring of Figure 8 is formed from the blank of Figure 7 by punching, blast piercing, cutting, grinding or honing slots 60 in the wall of the blank. The slots preferably extend substantially along the entire length of the blank between the end attaching formations 54 and 56 and are substantially parallel to the axis of the blank. The slots may be formed with arcuate lateral edges similar to the slots of the spring of Figure 5 as shown in Figure 8, or may be of rectangular outline as shown in Figure 9 similar to the slots shown in the spring of Figures 1–4. The construction of Figure 8 is preferred for maximum performance for the same reasons that make the spring of Figure 5 superior to spring of Figure 2.

After formation of the slots in the wall of the blank, the spring is ready for use, although in some cases heat treatment may be desired to obtain certain performance characteristics. It is a feature of the torsion spring of Figures 7-9 that they are effective to handle torsion loads applied in either direction or torsion loads applied alternately in opposite directions.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An annular torsion spring comprising a continuous annular wall member, means formed at the opposite ends of said wall member for transmitting torsion loads to said wall member, and a plurality of parallel slots extending through said wall member axially of said annular wall member and extending substantially the entire distance between said torsion load transmitting means.

2. The torsion spring according to claim 1 wherein the walls of said slots are smoothly curved.

3. A spring comprising a continuous integral one piece metal wall member of substantially uniform thickness having a plurality of elongated through slots, the longitudinal axes of the slots being substantially parallel to each other and substantially normal to the direction of the loading force applied to the spring, the side edges of the slots being smoothly curved along their lengths, the lateral distance between the side edges of the slots being greatest adjacent the longitudinal midpoint of the slots.

References Cited in the file of this patent

UNITED STATES PATENTS

| | | |
|---|---|---|
| 2,171,185 | Maier | Aug. 29, 1939 |
| 2,727,738 | Lindley | Dec. 20, 1955 |

FOREIGN PATENTS

| | | |
|---|---|---|
| 2,222 | Great Britain | of 1872 |
| 389,907 | Great Britain | Mar. 30, 1933 |
| 482,306 | Great Britain | Mar. 28, 1938 |
| 519,524 | Great Britain | Mar. 29, 1940 |